US008291431B2

(12) United States Patent
Du et al.

(10) Patent No.: US 8,291,431 B2
(45) Date of Patent: Oct. 16, 2012

(54) DEPENDENT INSTRUCTION THREAD SCHEDULING

(75) Inventors: Yun Du, San Diego, CA (US); Guofang Jiao, San Diego, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1529 days.

(21) Appl. No.: 11/468,221

(22) Filed: Aug. 29, 2006

(65) Prior Publication Data

US 2008/0059966 A1 Mar. 6, 2008

(51) Int. Cl.
*G06F 9/46* (2006.01)
*G06F 9/40* (2006.01)
(52) U.S. Cl. ........................................ 718/106; 712/216
(58) Field of Classification Search .................. 718/102, 718/106; 712/216
See application file for complete search history.

(56) References Cited

U.S. PATENT DOCUMENTS

| | | | | |
|---|---|---|---|---|
| 5,488,730 | A * | 1/1996 | Brown et al. | 712/41 |
| 5,923,862 | A | 7/1999 | Nguyen et al. | |
| 6,557,095 | B1 | 4/2003 | Henstrom | |
| 6,950,927 | B1 | 9/2005 | Apisdorf et al. | |
| 7,051,187 | B2 | 5/2006 | Garg et al. | |
| 7,847,803 | B1 * | 12/2010 | Van Hook | 345/559 |
| 2002/0124244 | A1 * | 9/2002 | Skaringer et al. | 717/171 |
| 2007/0260856 | A1 * | 11/2007 | Tran et al. | 712/217 |

FOREIGN PATENT DOCUMENTS

| | | |
|---|---|---|
| JP | 7505494 | 6/1995 |
| JP | 2008015562 A | 1/2008 |
| WO | 0033183 | 6/2000 |

OTHER PUBLICATIONS

Theobald, K. B. et al.: "Superconducting Processors for HTMT: Issues and Challenges" Frontiers of Massively Parallel Computation, 1999. Frontiers '99. The Seventh Symposium on the Annapolis, MD, USA Feb. 21-25, 1999, Los Alamitos, CA, USA, IEEE Comput. Soc, US, Feb. 21, 1999, pp. 260-267, XP010323709 ISBN: 0-7695-0087-0.
International Search Report, PCT/US07/076867—International Search Authority, European Patent Office—Dec. 21, 2007.
Written Opinion—PCT/US2007/076867, International Search Authority, European Patent Office, Dec. 21, 2007.
Bernard Goossens,"A Multithreaded Vector Co-processor", Lecture Notes in Computer Science, Parallel Computing Technologies,Sep. 8, 1997, vol. 1277, p. 311-321.
Hyoung-Joon Park and Lee-Sup Kim,"Static Forwarding:An Approach to Reduce Data Hazards in VLIW Processor", Journal of the Institute of Electronics Engineers of Korea, Feb. 25, 1998, vol. 35-C, No. 2, 98-35C-2-1, p. 65-73.

* cited by examiner

*Primary Examiner* — Meng An
*Assistant Examiner* — Brian Chew
(74) *Attorney, Agent, or Firm* — Charles David Brown; James R. Gambale, Jr.

(57) ABSTRACT

A thread scheduler includes context units for managing the execution of threads where each context unit includes a load reference counter for maintaining a counter value indicative of a difference between a number of data requests and a number of data returns associated with the particular context unit. A context controller of the thread context unit is configured to refrain from forwarding an instruction of a thread when the counter value is nonzero and the instruction includes a data dependency indicator indicating the instruction requires data returned by a previous instruction.

41 Claims, 3 Drawing Sheets

DEPENDENT INSTRUCTION THREAD SCHEDULING

BACKGROUND

1. Field

The present invention relates generally to graphics processors and more specifically to thread scheduling of threads having dependent instructions.

2. Background

Specialized processors are often used to perform specific functions related to a type of application in order to efficiently and quickly perform operations related to the application. For example, graphic processors perform various graphics operations to process image data and render an image and are efficient at manipulating and displaying computer graphics. Due to their highly-parallel structure, graphics processors are more effective than typical general processors for a range of complex algorithms. A graphics processor implements a number of graphics primitive operations in a way that makes executing the operations much faster than presenting the graphics directly to a screen with the host central processing unit (CPU).

In order to efficiently utilize resources in a specialized processor such as a graphics processor, tasks are often organized into threads where execution of the threads can be performed simultaneously or pseudo-simultaneously. Since a resource typically can address only a single instruction at a given time, a thread scheduler is used to control the timing of the execution of the instructions of the various threads and efficiently allocate resources to the threads. Some instructions, however, require the retrieval of data from a data source having an unpredictable latency. For example, retrieval of data from some memories within a processor system may have an unpredictable latency due to data size or location. Another example of a data source with an unpredictable latency is a texture engine that returns texture data in a graphics processor. Due to the variable complexity of texture instruction, the time required to return the texture data can not be predicted. An instruction of a thread may or may not require the retrieval of data from a data source with unpredictable latency. During the execution of a thread, a dependent instruction may require data acquired by a previous instruction to execute the dependent instruction. Where the required data is acquired from an unpredictable latency data source, the required data may not be returned in time to execute the dependent instruction.

One technique for managing threads in conventional system includes checking data availability before executing every instruction of a particular thread. Such methods, however, require complicated detection schemes that utilize resources. Another technique used in conventional systems includes placing instructions on hold until a load instruction is completed which results in low efficiency.

Therefore, there is a need for a thread scheduler for efficiently managing the execution of threads having dependent instructions.

SUMMARY

A thread scheduler includes thread context units for submitting instructions of threads for scheduling by the thread scheduler where each context register includes a load reference counter for maintaining a counter value indicative of a difference between a number of data requests and a number of data returns associated with the particular context register. A thread context controller of the context unit is configured to refrain from submitting an instruction of a thread when the counter value is nonzero and the instruction includes a data dependency indicator indicating the instruction requires data returned by a previous instruction.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
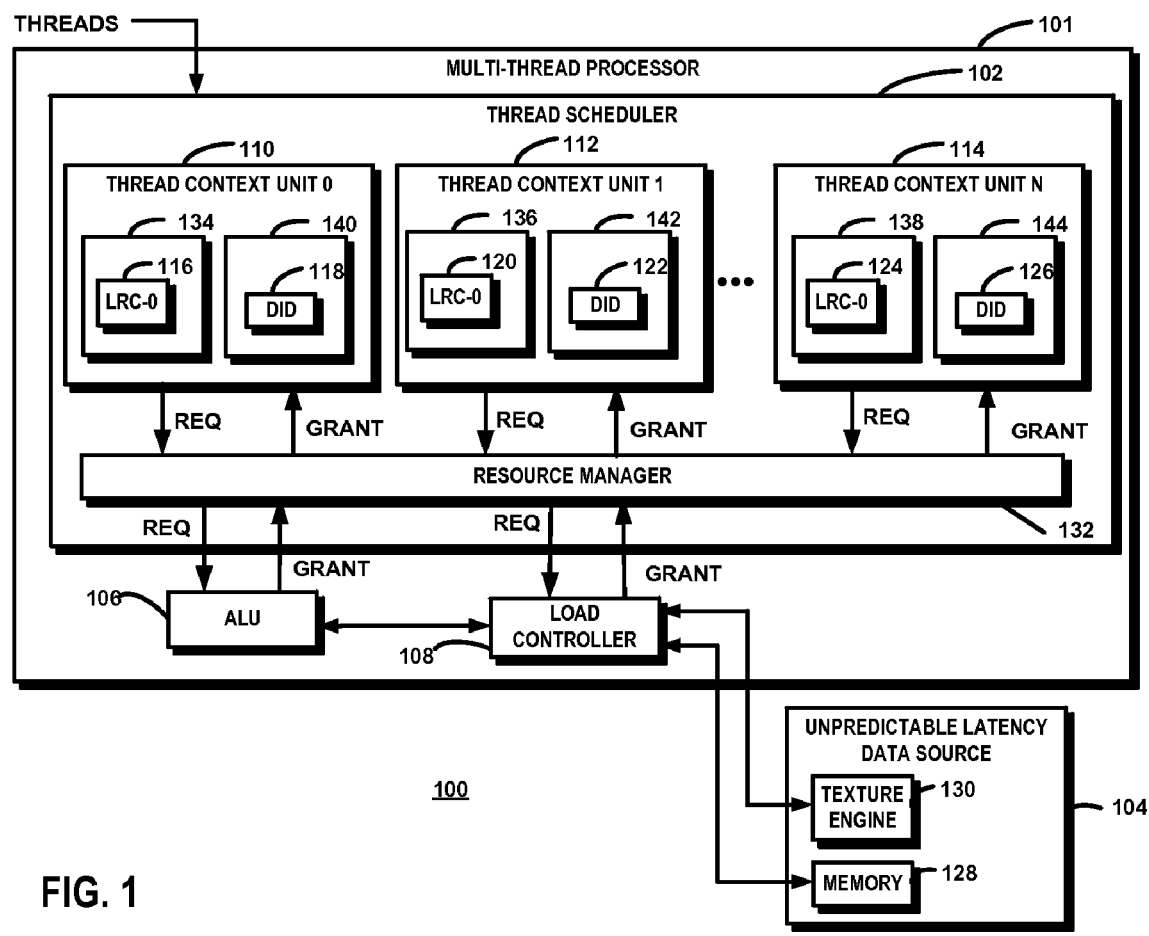
FIG. 1 is a block diagram of a thread management system in accordance with the exemplary embodiment of the invention.

FIG. 1 is a block diagram of a thread managing system 100 in accordance with an exemplary embodiment of the invention. The thread managing system 100 may include other processes, entities, engines, and/or functions in addition to those discussed with reference to FIG. 1. The blocks illustrated in FIG. 1 may be implemented using any combination of hardware, software, and/or firmware. Further, the functions and operations of the blocks described in FIG. 1 may be implemented in any number of devices, circuits, or elements. Two or more of the functional blocks may be integrated in a single device and the functions described as performed in any single device may be implemented over several devices. An example of a suitable implementation of the thread management system 100 includes implementing the system 100 as part of a multi-thread processor 101. The techniques discussed, however, may be applied to any of various processors or computer systems that are used to schedule and process multiple threads.

In the exemplary embodiment, a thread scheduler 102, an arithmetic logic unit (ALU) 106, a load controller 108, an instruction cache (not shown), register file bank (not shown), constant random access memory (RAM) (not shown), other functions are implemented in a multi-threaded processor 101. The multi-thread processor 101 is a programmable processor configured to efficiently process particular types of data streams. An example of a suitable multi-thread processor 101 includes a multi-thread processor that includes constant data for efficiently processing multi-media data streams (e.g., video, audio, etc.). The constant RAM supports the ALU by improving register bank retrieval efficiency. An instruction cache stores instructions for the threads to provide instructions to the thread scheduler 102. Under the control of the thread scheduler 102, load controller 108 loads the instruction cache with instructions from memory 128 and loads the constant RAM and the register file bank with data from the memory 128 and/or the texture engine 130. The instructions indicate specific operations to be performed for each thread. Examples of suitable operations include arithmetic operations, elementary functions, and memory access operations.

The constant RAM stores constant values used by ALU 106. The register file bank may store temporary results as well as final results from ALU 106 for threads. An output interface (not shown) receives the final results for the executed threads from register file bank and provides the results to the corresponding applications.

The thread managing system 100 receives threads, such as graphics threads for example, from an application. Generally, the thread scheduler 102 receives a thread stream and performs various functions to schedule and manage execution of threads. For example, the thread scheduler 102 may schedule processing of threads, determine whether resources needed by a particular thread are available, and move thread data to a register file bank via the load controller 108. The thread scheduler 102 interfaces with the load controller 108 in order to synchronize the resources for received threads. The thread scheduler 102 may also monitor the order in which threads are received from a particular application and cause those threads to be outputted in the same order or sequence as received.

The thread scheduler 102 selects active threads for execution, checks for read/write port conflicts among the selected threads and, if there are no conflicts, assigns an appropriate instruction from a thread into an ALU 106 and sends another instruction of another thread to the load controller 108. At the request of the thread scheduler 102, the load controller 108 may also be configured to obtain data associated with a thread from an unpredictable latency data source 104 such as a texture engine 130 or external memory 128. The memory 128 may include a global data cache and/or an external memory device, for example. In addition to issuing fetch requests for missing instructions, the load controller 108 loads thread data into a register file bank (not shown) and associated instructions into an instruction cache (not shown). The thread scheduler 102 also removes threads that have been processed by ALU 106.

The ALU 106 may be a single quad ALU or may include four scalar ALUs. In the exemplary embodiment, the ALU 106 performs pixel-parallel processing on one component of an attribute for up to four pixels. In some circumstances, the ALU 106 performs component-parallel processing on up to four components of an attribute for a single pixel. The ALU 106 fetches data from the register file bank and receives constants from constant RAM. Ideally, the ALU 106 processes data at every clock cycle so that it is not idle, thereby increasing processing efficiency. The ALU 106 may include multiple read and write ports on an interface to register file bank so that it is able to provide thread results while new thread data is fetched/read on each clock cycle.

The thread scheduler includes a plurality of thread context units 110, 112, 114 for managing and submitting threads for execution through a thread arbitration/resource manager (referred to herein as a resource manager) 132. Each thread is assigned to a thread slot and managed on an associated thread context unit 110, 112, 114. A thread context register 134, 136, 138 within each thread connect unit 110, 112, 114 stores the instruction type and other information for each instruction of the thread. A thread context controller 140, 142, 144 within each thread context unit 110, 112, 114 controls the submission of instructions to the resource manager 132. A thread context unit requests resources from the resource manager 132. When a resource is available, the resource manager grants the request. The flow controller (not shown) and the resource manager 132 within the thread scheduler 102 allow each thread to access the ALU 106, load controller 108, and instruction cache (not shown) to allow each thread context unit 110, 112, 114 to load data and to have instructions executed by the appropriate resource to execute the thread.

In order to execute an instruction, the thread context unit first requests that the instruction be loaded into an instruction cache. The instruction is at least partly decoded and the context control 140 within the thread context unit 110 determines whether the instruction should be executed based on an existence of a dependency indicator and a value of the load reference counter (LRC) 116 of the thread context unit 110. When an instruction is submitted by the thread context unit, an instruction type indicates to the resource manager 132 the resource needed to execute the instruction. The requested resource may be the ALU 106, memory 128, or texture engine 130, for example. When the resource is granted, the instruction is forwarded to the available resource for execution. The resource manager (thread arbitration manager) 132, therefore, manages the allocation of the requested resources to grant the requested resources to the requesting thread context units.

An instruction within a thread may have a predictable latency or an unpredictable latency. Instructions that have a predictable latency are referred to herein as predictable latency instructions and include instructions that are executed within a known number of clock cycles. Examples of predictable latency instructions include ALU operations and other operations that do not require resources external to the multi-threaded processor core. In the exemplary embodiment, internal multi-thread processor 101 operations are designed to have a standard latency. Instructions that do not have predictable latencies are referred to herein as unpredictable latency instructions. Examples of unpredictable latency instructions include operations that require external resources outside of the multi-threaded processor 101. For example, texture related instructions and data retrieval instructions accessing external memory have unpredictable latency.

Therefore, a particular instruction may require the retrieval of data from a data source that has an unpredictable latency. In the exemplary embodiment, the unpredictable data source 104 may be a texture engine 130 or memory 128. A texture related instruction within the thread requires the texture engine 130 to process information provided by the instruction and to return texture data. A memory related instruction requires the retrieval of stored data stored within the memory 128. Where the memory is off chip, the time required to retrieve the requested data may not be predictable. Other situations may arise where a particular data retrieval event has an unpredictable latency.

The thread context units include appropriate resources for managing the execution of the threads. In addition to the thread context register 134, 126, 138, the thread context unit 110, 112, 114 includes a context controller 140, 142, 144 implemented in logic for managing the execution of the thread. As discussed below with reference to FIG. 2, a context controller can be modeled with a state machine where the context controller transitions between a finite set of states. In the exemplary embodiment, each thread context register 110, 112, 114 includes a load reference counter (LRC) 116, 120, 124 and each connect controller 140, 142, 144 includes a dependency indicator detector (DID) 118, 122, 126. Each LRC is incremented by one when a request for data is placed from the associated thread context unit executing the thread. Each LRC is decremented by one when the requested data is returned from the source. Therefore, the load reference counter (LRC) is configured to maintain a counter value indicative of a difference between a number of data requests and a number of data returns for the particular thread. The dependency indicator detectors 118, 122, 126 are configured to detect a dependency indicator in an instruction. The dependency indicator may be any type of data, flag, bit, or other indicator that indicates whether the instruction requires data from a previous instruction in the thread. When the source code is compiled to create the thread code, the dependency indicators are added. In the exemplary embodiment, a single bit dependency indicator is added to each data dependent instruction of the thread. Accordingly, each instruction of a thread that requires data from a previous instruction includes the dependency indicator.

During the execution of a thread, each LRC is incremented and decremented in accordance with the data requests and returns for the corresponding thread. When the dependency indicator detector (DID) 112, 122, 126 identifies an instruction as dependent on a data from a previous instruction, the LRC is evaluated to determine if it is zero. If the LRC is nonzero, the thread context unit refrains from submitting the instruction and the thread context unit is placed in a wait state. The instruction is executed when the LRC is equal to zero.

Figure 2:
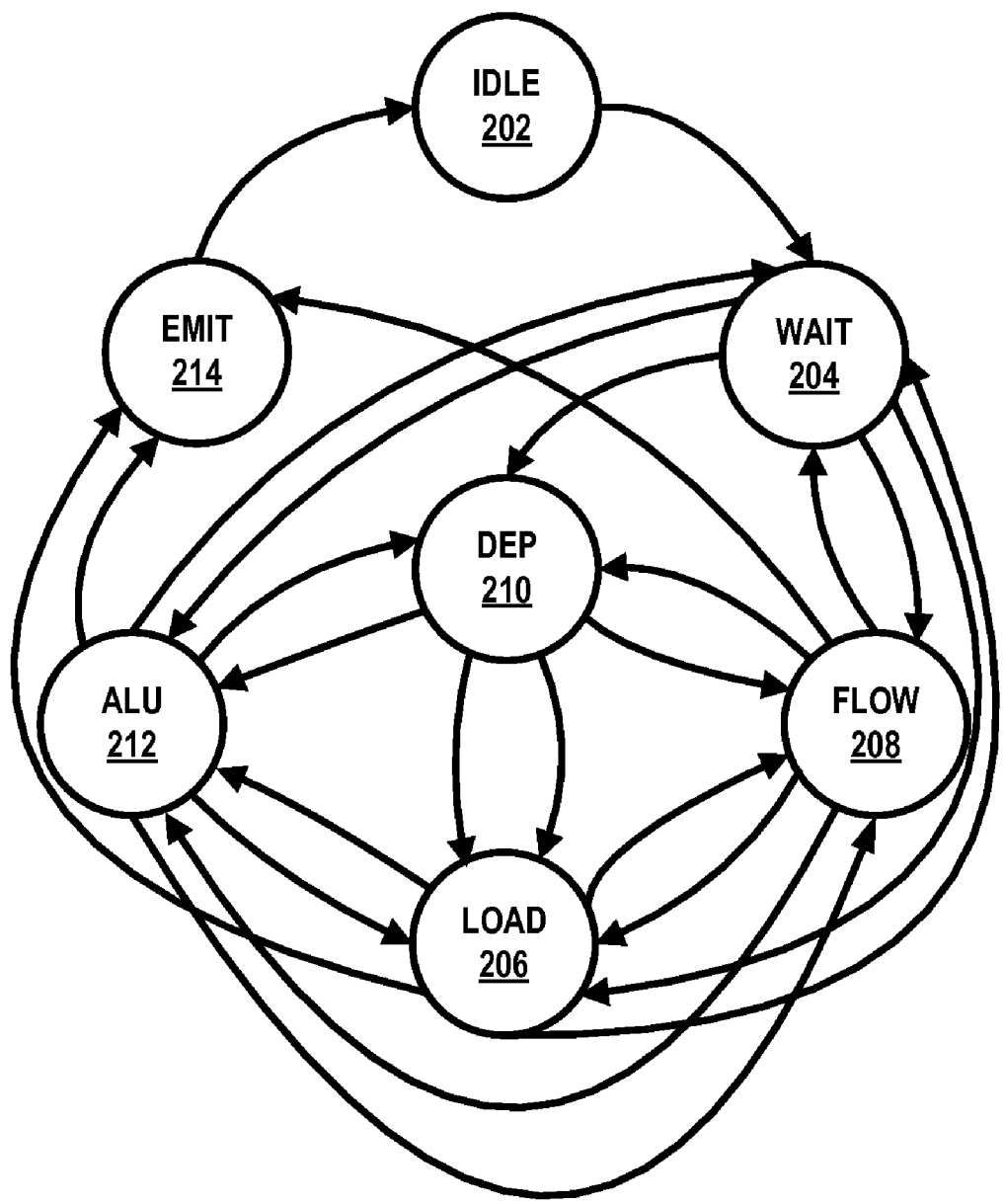
FIG. 2 is a state machine diagram of thread control in accordance with the exemplary embodiment.

FIG. 2 is a state machine diagram of thread control in accordance with the exemplary embodiment. The state machine diagram is a model of behavior composed of states, transitions and actions. A state stores information about the past since it reflects the input changes from the system start to the present. A transition is indicated by the arrows in FIG. 2 and indicates a state change. Particular conditions must be met in order for a transition to occur. FIG. 2 is representative of the states and transitions of a thread context unit. Accordingly, each thread context unit may be in a different state during operation of the thread scheduler.

In the exemplary embodiment, the thread context unit may be in one seven states including an IDLE state 202, an ALU state 204, a LOAD state 206, a FLOW state 208, a DEP state 210, a WAIT state 212, and a EMIT state 214. All threads begin and end in the IDLE state 202. The thread context unit is awaiting a new thread in the IDLE state 202. An instruction type is presented to the resource manager 132 when transitioning from the IDLE state to the WAIT state 204 where the thread context unit waits for a resource to become available. When the load controller is available, the instruction is loaded from the instruction cache and the instruction is executed. The instruction may include an ALU operation, a load operation, or a texture operation. Depending on the particular instruction and the current state, the thread context unit transitions to the appropriate state. In the FLOW state 208, the thread context unit performs flow control tasks and updates the program counter. In the LOAD state 206, the thread context unit performs load tasks such as initial loading, loading texture data, loading data from memory and other load and store execution. In the WAIT state 204, the thread context unit waits for a resource. The arithmetic logic unit (ALU) 106 is accessed in the ALU state 204 to perform an arithmetic or logic instruction. When a dependency indicator is detected in an instruction and the LRC is nonzero, the thread context unit enters the DEP state 210. When the LRC returns to zero, the thread context unit transitions to the previous exit state. During the EMIT state 214, the returned result of the instruction is moved out of the context register.

Figure 3:
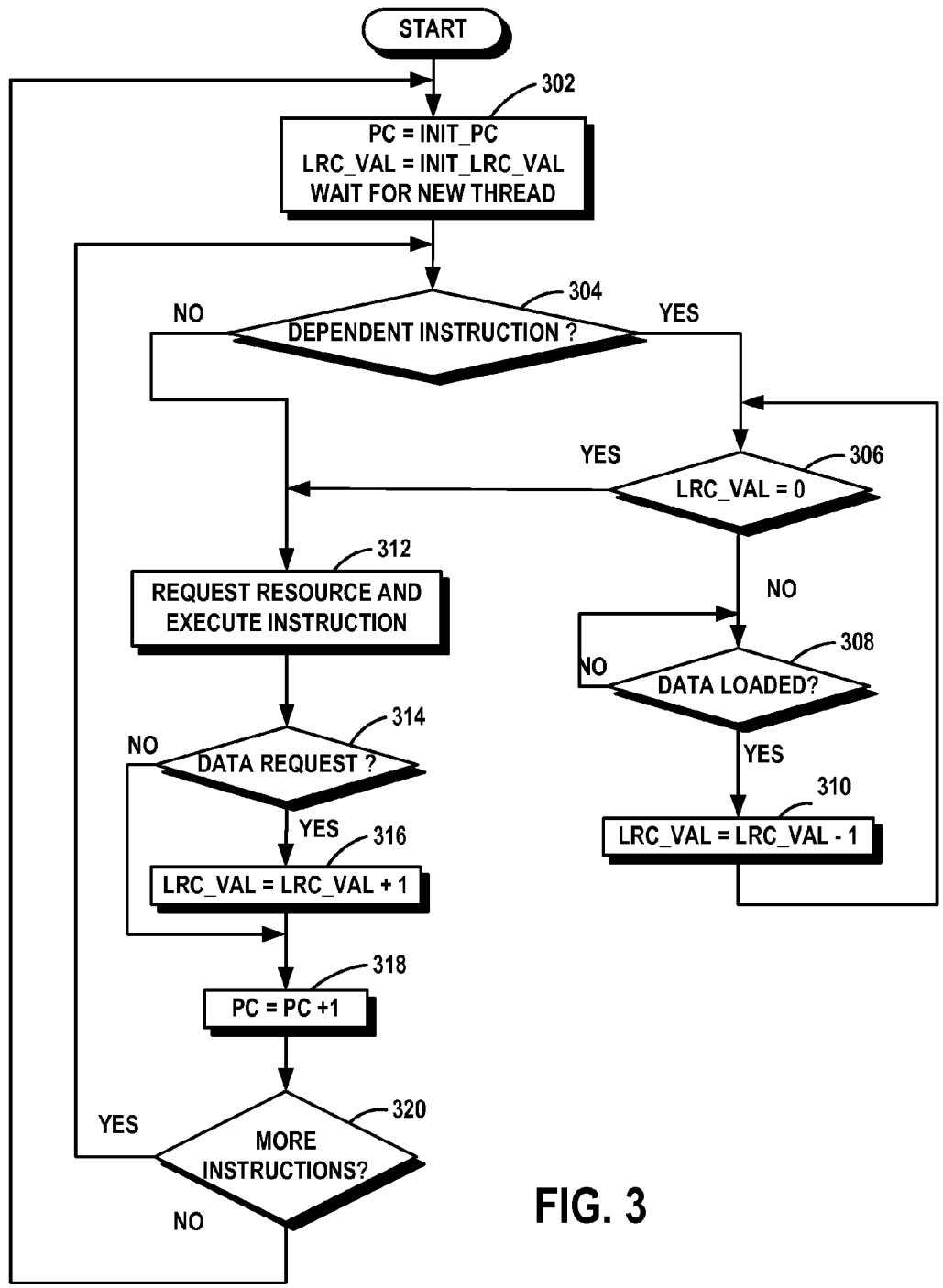
FIG. 3 is flow chart of a method of managing threads with dependent instructions in accordance with the exemplary embodiment.

FIG. 3 is flow chart of a method of managing threads with dependent instructions in accordance with the exemplary embodiment. Although the method may be applied other structures, the method is executed by a thread context unit in the exemplary embodiment. The following steps provide an example of performing the dependent instruction related techniques discussed with reference to FIG. 2. Accordingly, other operations of the thread context unit can be modeled with other blocks or flow charts that are omitted in FIG. 3 in the interest of clarity and brevity. In the exemplary embodiment, the method is performed by logic circuitry performing the operations of the context controller 140, 142, 144.

As discussed below, the actions of the context controller logic is dictated by the compiled thread code. Accordingly, during the compiling procedure, the compiler identifies the dependencies indicated in a higher level code and inserts the dependency indicators within the appropriate locations of the instructions that is recognized by the context controller.

At step 302, the program counter (PC) and the load reference counter value (LRC_VAL) are initialized for the new thread. A global register sets the initialized values for the thread. Where an application requires a thread to begin at a step other than step 0 (first step), INIT_PC may be nonzero and the PC may be set to a nonzero value. Where no data is required to be preloaded, the INIT_LRC_VAL is zero. If, however, the thread requires data to be preloaded such as texture data, for example, the INIT_LRC_VAL may be set to a non-zero value. The thread context unit is in an IDLE state 202 and waiting for a new thread. When a new thread is assigned, the method continues at step 304.

At step 304, it is determined whether the current instruction is a dependent instruction. If a dependency indictor is detected in the instruction, the instruction is identified as a dependent instruction and the method continues at step 306. Otherwise, the method proceeds to step 312.

At step 306, it is determined whether the LRC value (LRC_VAL) is equal to zero. If the LRC is equal to zero, the method continues at step 312. If the LRC value is nonzero, the method proceeds to step 308.

At step 308, it is determined whether requested data has been retrieved. In the exemplary embodiment, the load controller indicates that the data has been returned to the appropriate register file. If data has been returned, the method continues at step 310, where the LRC is decremented by 1. Otherwise, the method returns to step 308. After step 310, method returns to step 306.

At step 312, a request is placed for the appropriate resource to execute the instruction. When the resources are available and granted by the resource manager (thread arbitration manager) 132, the instruction is executed by the appropriate resource.

At step 314, it is determined whether the instruction has requested data. If data has been requested, the method continues at step 316 where the LRC value is incremented by 1 before the method proceeds to step 318. If no data has been requested, the method proceeds to step 318.

At step 318 the program counter is incremented by 1. At step 320, it is determined weather the next PC instruction exists for the thread. If the there are more instructions the method returns to step 304. Otherwise, the method returns to step 302 to wait for the next thread.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A processor comprising a hardware-based thread context unit configured to forward instructions of a thread for execution by the processor, the thread context unit comprising:
   a load reference counter configured to maintain a counter value of a difference between a number of data requests of one or more previous instructions of the thread and a number of data returns in response to the data requests of the previous instructions of the thread; and
   a context controller configured to evaluate the load reference counter when a current instruction of the thread includes a data dependency indicator indicating the current instruction requires data returned by one of the previous instructions of the thread and further configured to refrain from submitting the current instruction of the thread for execution by the processor when the counter value is nonzero.

2. A processor comprising a thread context unit in accordance with claim 1, wherein the number of data requests is a number of data requests for data from an unpredictable latency data source and the number of data returns is a number of data returns from the unpredictable latency data source.

3. A processor comprising a thread context unit in accordance with claim 2, wherein the unpredictable latency data source is a memory.

4. A processor comprising a thread context unit in accordance with claim 2, wherein the unpredictable latency data source is a texture engine.

5. A processor comprising a thread context unit in accordance with claim 2, wherein the context controller is implemented in logic and comprises a dependency indicator detector configured to detect the data dependency indicator.

6. A processor comprising a thread context unit in accordance with claim 1, wherein the context controller is further configured to submit the instruction for execution by the processor when the counter value is zero.

7. A processor comprising a thread context unit in accordance with claim 2, wherein the context controller is further configured to increment the counter when identifying the data requests of the one or more previous instructions from the unpredictable latency data source and configured to decrement the counter in response to identifying the data returns in response to the data requests for the previous instructions of the thread from the unpredictable latency data source.

8. A processor comprising a thread scheduler configured to allocate requested resources to a plurality of thread context registers for managing the execution of threads by the processor, the thread scheduler comprising:
   a plurality of load reference counters, wherein each of the threads is assigned to one of the plurality of load reference counters, wherein each load reference counter is configured to maintain a counter value of a difference between a number of data requests of one or more previous instructions of an assigned one of the threads and a number of data returns in response to the data requests of the previous instructions of the assigned one of the threads associated with a thread context unit,
   wherein the thread scheduler is configured to evaluate an assigned load reference counter associated with a thread when a current instruction of the thread includes a data dependency indicator indicating the current instruction requires data returned by one or more previous instructions of the thread and further configured to refrain from forwarding the current instruction of the thread for execution by the processor when a counter value maintained by the assigned load reference counter associated with the thread is nonzero.

9. A processor comprising a thread scheduler in accordance with claim 8, wherein the number of data requests is a number of data requests for data from an unpredictable latency data source and the number of data returns is a number of data returns from the unpredictable latency data source.

10. A processor comprising a thread scheduler in accordance with claim 9, wherein the unpredictable latency data source is a memory.

11. A processor comprising a thread scheduler in accordance with claim 9, wherein the unpredictable latency data source is a texture engine.

12. A processor comprising a thread scheduler in accordance with claim 9, wherein the thread scheduler further comprises a plurality of dependency indicator detectors, each dependency indicator detector configured to detect the data dependency indicator.

13. A processor comprising a thread scheduler in accordance with claim 8, the thread scheduler further configured to execute the instruction when the counter value is zero.

14. A processor comprising a thread scheduler in accordance with claim 9, wherein the thread scheduler is further configured to increment the counter when identifying the data requests of the one or more previous instructions from the unpredictable latency data source and configured to decrement the counter in response to identifying the data returns in response to the data requests for the previous instructions of the thread from the unpredictable latency data source.

15. A graphics processor for processing graphical threads, the graphics processor comprising:
an arithmetic logic unit configured to perform arithmetic functions in accordance with instructions of graphics threads managed by thread context units;
a load controller configured retrieve data from an unpredictable latency data source in accordance with the instructions;
a thread scheduler configured to allocate requested resources to thread context units, the thread scheduler comprising:
a plurality of load reference counters, wherein each of the graphics threads is assigned to one of the plurality of load reference counters, wherein each load reference counter is configured to maintain a counter value of a difference between a number of data requests of one or more previous instructions of an assigned one of the graphics threads presented by a thread context unit for data from an unpredictable latency data source and a number of data returns in response to the data requests for the previous instructions of the assigned one of the graphics threads performed by the load controller from the unpredictable latency data source and associated with the thread context unit, the thread scheduler configured to evaluate a load reference counter associated with a graphics thread when a current instruction of the graphics thread includes a data dependency indicator indicating the current instruction requires data returned by one or more previous instructions of the graphics thread and further configured to refrain from forwarding a current instruction of the graphics thread for execution by the processor when a counter value maintained by the load reference counter associated with the graphics thread is nonzero.

16. A graphics processor in accordance with claim 15, wherein the unpredictable latency data source is a memory.

17. A graphics processor in accordance with claim 15, wherein the unpredictable latency data source is a texture engine.

18. A graphics processor in accordance with claim 15, wherein the thread scheduler further comprises a plurality of dependency indicator detectors, each dependency indicator detector configured to detect the data dependency indicator.

19. A graphics processor in accordance with claim 15, the thread scheduler further configured to execute the instruction when the counter value is zero.

20. A graphics processor in accordance with claim 15, wherein the thread scheduler is further configured to increment the counter when identifying the data requests of the one or more previous instructions from the unpredictable latency data source and configured to decrement the counter in response to identifying the data returns in response to the data requests for the previous instructions of the thread from the unpredictable latency data source.

21. A method comprising:
maintaining, by a load reference counter of a hardware-based thread context unit of a processor, wherein the hardware-based thread context unit is configured to forward instructions of a thread for execution by the processor, a counter value of a difference between a number of data requests of one or more previous instructions of the thread and a number of data returns in response to the data requests for the previous instructions of the thread;
evaluating, by a context controller of the hardware-based thread context unit, the load reference counter when a current instruction includes a data dependency indicator indicating the current instruction requires data returned by one of the previous instructions of the thread; and
refraining, by the context controller of the hardware-based thread context unit, from submitting the current instruction of the thread for execution by the processor when the counter value is nonzero.

22. The method of claim 21, wherein the number of data requests is a number of data requests for data from an unpredictable latency data source and the number of data returns is a number of data returns from the unpredictable latency data source.

23. The method of claim 22, wherein the unpredictable latency data source is a memory.

24. The method of claim 22, wherein the unpredictable latency data source is a texture engine.

25. The method of claim 22, wherein the context controller is implemented in logic, the method further comprising detecting, by a dependency indicator detector of the context controller, the data dependency indicator.

26. The method of claim 22, further comprising:
incrementing, by the context controller, the counter when identifying the data requests of the one or more previous instructions from the unpredictable latency data source; and
decrementing, by the context controller, the counter in response to identifying the data returns in response to the data requests for the previous instructions of the thread from the unpredictable latency data source.

27. The method of claim 21, further comprising submitting, by the context controller, the instruction for execution by the processor when the counter value is zero.

28. A processor comprising a hardware-based thread context unit configured to forward instructions of a thread for execution by the processor, the thread context unit comprising:
means for maintaining a counter value of a difference between a number of data requests of one or more previous instructions of the thread and a number of data returns in response to the data requests for the previous instructions of the thread;
means for evaluating the load reference counter when a current instruction includes a data dependency indicator indicating the current instruction requires data returned by one of the previous instructions of the thread; and
means for refraining from submitting the current instruction of the thread for execution by the processor when the counter value is nonzero.

29. The processor of claim 28, wherein the number of data requests is a number of data requests for data from an unpredictable latency data source and the number of data returns is a number of data returns from the unpredictable latency data source.

30. The processor of claim 29, wherein the unpredictable latency data source is a memory.

31. The processor of claim 29, wherein the unpredictable latency data source is a texture engine.

32. The processor of claim 29, wherein the hardware-based thread context unit further comprises means for detecting the data dependency indicator.

33. The processor of claim 29, wherein the hardware-based thread context unit further comprises:

means for incrementing the counter when identifying the data requests of the one or more previous instructions from the unpredictable latency data source; and means for decrementing the counter in response to identifying the data returns in response to the data requests for the previous instructions of the thread from the unpredictable latency data source.

34. The processor of claim 28, wherein the hardware-based thread context unit further comprises means for submitting the instruction for execution by the processor when the counter value is zero.

35. A non-transitory computer-readable storage medium having stored thereon instructions that, when executed, cause a hardware-based thread context unit of a processor, wherein the hardware-based thread context unit is configured to forward instructions of a thread for execution by the processor, to:

maintain a counter value of a difference between a number of data requests of one or more previous instructions of the thread and a number of data returns in response to the data requests for the previous instructions of the thread;

evaluate the load reference counter when a current instruction includes a data dependency indicator indicating the current instruction requires data returned by one of the previous instructions of the thread; and refrain from submitting the current instruction of the thread for execution by the processor when the counter value is nonzero.

36. The non-transitory computer-readable storage medium of claim 35, wherein the number of data requests is a number of data requests for data from an unpredictable latency data source and the number of data returns is a number of data returns from the unpredictable latency data source.

37. The non-transitory computer-readable storage medium of claim 36, wherein the unpredictable latency data source is a memory.

38. The non-transitory computer-readable storage medium of claim 36, wherein the unpredictable latency data source is a texture engine.

39. The non-transitory computer-readable storage medium of claim 36, further comprising instructions that cause the hardware-based thread context unit to detect the data dependency indicator.

40. The non-transitory computer-readable storage medium of claim 36, further comprising instructions that cause the hardware-based thread context unit to:

increment the counter when identifying the data requests of the one or more previous instructions from the unpredictable latency data source; and decrement the counter in response to identifying the data returns in response to the data requests for the previous instructions of the thread from the unpredictable latency data source.

41. The non-transitory computer-readable storage medium of claim 35, further comprising instructions that cause the hardware-based thread context unit to submit the instruction for execution by the processor when the counter value is zero.

* * * * *